United States Patent
Schöning

(10) Patent No.: US 10,074,007 B2
(45) Date of Patent: Sep. 11, 2018

(54) METHOD AND DEVICE FOR INFORMING A USER DURING APPROACH TO A DESTINATION

(71) Applicant: VOLKSWAGEN AG, Wolfsburg (DE)

(72) Inventor: Volkmar Schöning, Wedemark (DE)

(73) Assignee: VOLKSWAGEN AG (DE)

( * ) Notice: Subject to any disclaimer, the term of this patent is extended or adjusted under 35 U.S.C. 154(b) by 141 days.

(21) Appl. No.: 15/190,390

(22) Filed: Jun. 23, 2016

(65) Prior Publication Data
US 2016/0379045 A1 Dec. 29, 2016

(30) Foreign Application Priority Data
Jun. 23, 2015 (DE) .................. 10 2015 211 627

(51) Int. Cl.
*G06K 9/00* (2006.01)
*G06F 17/30* (2006.01)
*G10L 17/00* (2013.01)

(52) U.S. Cl.
CPC ... *G06K 9/00288* (2013.01); *G06F 17/30867* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 7,440,554 B2 | 10/2008 | Elliot et al. | |
| 9,325,800 B1 * | 4/2016 | Eda | H04L 67/22 |
| 9,564,124 B2 * | 2/2017 | Boss | G10L 15/02 |
| 2004/0080618 A1 | 4/2004 | Norris et al. | |
| 2006/0164259 A1 * | 7/2006 | Winkler | G08G 1/127 340/944 |
| 2008/0317294 A1 * | 12/2008 | Hashimoto | G07C 9/00158 382/115 |
| 2009/0017803 A1 * | 1/2009 | Brillhart | G01C 21/20 455/414.2 |
| 2009/0157473 A1 * | 6/2009 | Belz | G06Q 30/02 705/14.58 |
| 2010/0082667 A1 * | 4/2010 | Callanan | G06F 17/30867 707/770 |
| 2011/0084825 A1 * | 4/2011 | John | G08G 1/123 340/438 |
| 2013/0088352 A1 | 4/2013 | Amis | |

(Continued)

FOREIGN PATENT DOCUMENTS

| | | |
|---|---|---|
| DE | 102012210784 A1 | 1/2014 |
| EP | 1233602 A1 | 8/2002 |

(Continued)

OTHER PUBLICATIONS

Search Report for German Patent Application No. 10 2015 211 627.1; dated Apr. 29, 2016.

*Primary Examiner* — Michelle M Entezari
(74) *Attorney, Agent, or Firm* — Barnes & Thornburg LLP

(57) ABSTRACT

A mode of transportation, a device, and a method for informing a user on approaching a destination which includes predefining the destination for the user requesting an identification of a person present at the destination, comparing the identification with associated person-related data and, in response to the result of the comparison, outputting a note to the user with respect to the person.

12 Claims, 2 Drawing Sheets

(56) References Cited

U.S. PATENT DOCUMENTS

| | | | | |
|---|---|---|---|---|
| 2014/0128103 A1* | 5/2014 | Joao | ...................... | H04W 4/206 |
| | | | | 455/456.3 |
| 2014/0266710 A1 | 9/2014 | Nguyen et al. | | |
| 2014/0343841 A1* | 11/2014 | Faaborg | ............. | G01C 21/3438 |
| | | | | 701/465 |
| 2015/0248426 A1* | 9/2015 | Che | ................... | G06F 17/30867 |
| | | | | 707/784 |
| 2015/0304437 A1* | 10/2015 | Vaccari | ................ | G06F 1/3215 |
| | | | | 709/204 |
| 2015/0356509 A1* | 12/2015 | Tretikov | .............. | G06Q 10/107 |
| | | | | 705/342 |
| 2017/0136992 A1* | 5/2017 | Hamada | ................ | B60R 25/245 |

FOREIGN PATENT DOCUMENTS

| | | |
|---|---|---|
| KR | 20120135611 A | 12/2012 |
| KR | 20150000353 A | 1/2015 |
| WO | 2011014941 A1 | 2/2011 |

* cited by examiner

METHOD AND DEVICE FOR INFORMING A USER DURING APPROACH TO A DESTINATION

PRIORITY CLAIM

This patent application claims priority to German Patent Application No. 10 2015 211 627.1, filed 23 Jun. 2015, the disclosure of which is incorporated herein by reference in its entirety.

SUMMARY

Illustrative embodiments relate to a device, a method and a means of transportation for informing a user on approaching a destination. Illustrative embodiments also relate to the submission of person-related information and preparing the user for an impending meeting with persons located at the destination.

BRIEF DESCRIPTION OF THE DRAWINGS

In the text which follows, illustrative embodiments are described in detail with reference to the accompanying drawings, in which.

DETAILED DESCRIPTION

Figure 1:
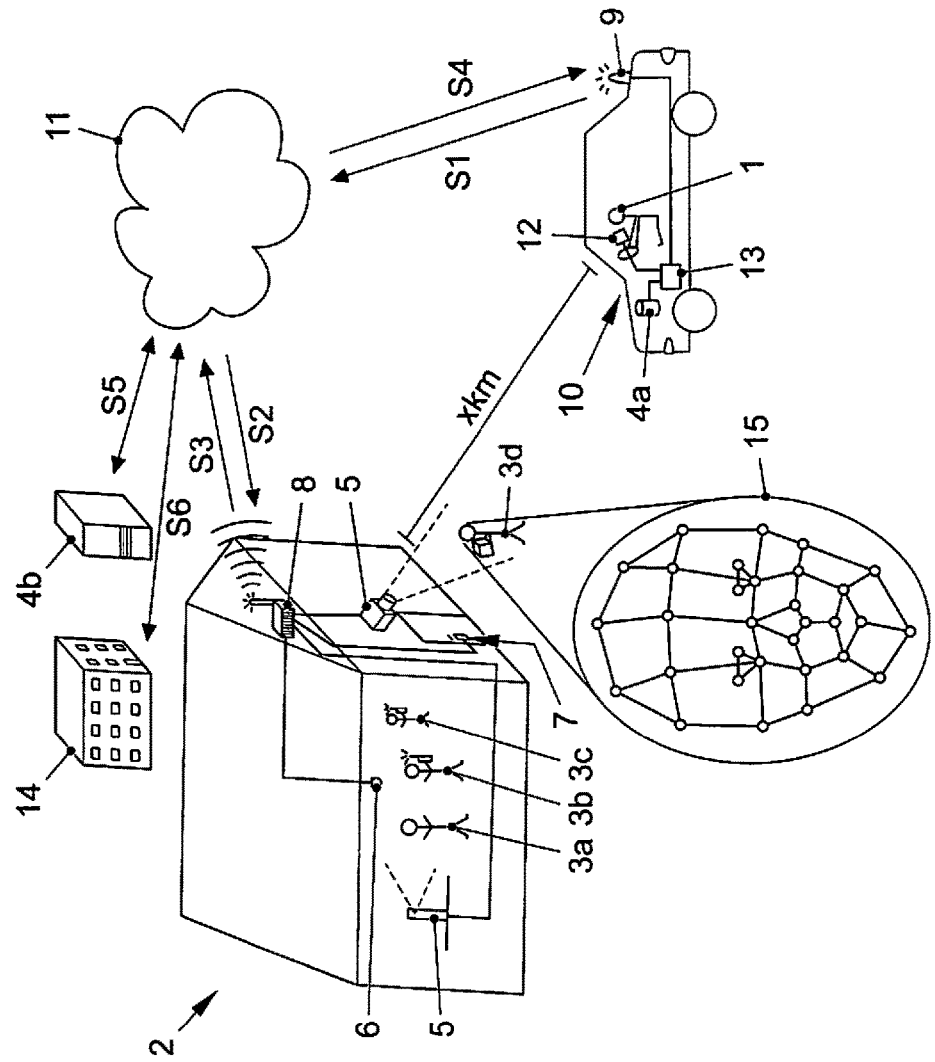
FIG. 1 shows a diagrammatic overview of components of an illustrative embodiment of a device during the execution of a method.

Disclosed embodiments relate to a device, a method and a means of transportation for informing a user on approaching a destination. Disclosed embodiments also relate to the submission of person-related information and preparing the user for an impending meeting with persons located at the destination.

In the prior art, navigation systems for outputting maneuvers are known which guide the user step by step to a predefined destination.

With respect to the monitoring technology, camera systems are known which can provide data of optical sensors for a remote access (e.g., via the Internet).

In addition, social networks in the Internet are known on which personal/person-related data are stored in member profiles.

U.S. Pat. No. 7,440,554 B2 discloses an alarm signal system for monitoring a property. The system is configured to report different events to the user of the system. For example, a message can be sent to the user when expected events (e.g., the appearance of particular persons at or up to a predetermined point in time) have not occurred.

US 2013/0088352 A1 discloses a sensor system by means of which the face of an intruder can be detected and subjected to face recognition. Based on the face recognition, the identity of the intruder can be determined.

US 2014/0 266 710 A1 discloses method operations which are carried out in conjunction with a coming-home scenario of a user. For this purpose, the distance of a user from his house is compared with a predefined reference to determine the return of the user. In response to this, for example, a garage door can be opened, a door unlatched and light switched on. In a completely different context, the basic detection of a movement of a person within a room by means of a camera is recognized.

US 2004/0 080 618 A1 discloses exemplary embodiments for monitoring a building by a user distant, for example, by thousands of kilometers. For this purpose, cameras are equipped with software which, for example, signals smoke/fire or intruders. In this context, it is also disclosed to signal movements of a person in the property to the user, particularly when the user is not in the property. Patterns of movement classify the user as an intruder or as (legal) customer or the like.

Disclosed embodiments prepare a user in the best possible way for the situations at a predefined destination of his trip.

Disclosed embodiments provide a method for informing a user on approaching a destination. The destination can be specified, for example, on the basis of a user input or based on experience (for example, due to sensor information and probability-based algorithms, for example, the repeated evening trip home on work days). On the basis of the predefined destination, an identification of a person present at the destination is requested. The person can be currently at the destination and/or be at the destination at least at the time of the (estimated) arrival of the user. The identification can take place, for example, supported by sensor. In addition, identification features which can be evaluated electronically in other ways (e.g., identifiers of electronic devices carried by the person) can be used for the identification of the person. Voice recognition can also be performed by means of a microphone. Subsequently, a comparison of the identification with associated person-related data is performed. This can be done in a technical device allocated to the user and/or at the destination and/or in an Internet-based processor. At appropriate locations, person-related data can be stored with which the identification of the person is compared. Finally, a note is output to the user with respect to the person on the basis of a result of the comparison. This can be an identification (name, portrait, nationality or the like) of the person. Alternatively or additionally, further person-related data can be output to the user to inform the latter about the persons which he will presumably meet at the destination.

The person-related data can be stored, for example, on a data memory of a wireless communication terminal (smartphone, tablet or the like) or in a means of transportation which is used by the user to reach the destination. Such a data memory is also called a "local" data memory. Alternatively or additionally, the person-related data can be stored in an Internet-based platform such as, for example, a web page. The web page can be a personal profile of the user or a corresponding listing of person-related data on an underside of a commercial web page. Prominent examples are the social networks, widely used today, which have a multiplicity of person-related data with relevance for personal meetings and/or potential topics for conversation. Alternatively or additionally, the person-related data can be stored in a database for persons who have become delinquent ("database of criminals").

The person-related data can inform the user about which subjects are suitable as starting point for a conversation and which he should rather avoid. For example, personal or familiar circumstances can be understood to be person-related data. Alternatively or additionally, the family status, a country of origin, the name of family members and their age, successes and illnesses etc., as person-related data, can provide for a best possible preparation of the user for the meeting.

At the destination, the persons can be identified, for example, by means of an optical camera which can be designed as monitoring camera accessible by Internet. Alternatively or additionally, a camera of a smartphone located at the destination or a doorbell system can support the disclosed method. Object recognition algorithms can be used for signaling details of recognized persons at the destination also to the approaching user.

Alternatively or additionally, the identification can take place by means of an electronic identification which can be designed, for example, as MAC address and/or Bluetooth name of a smartphone, of a "wearable" or intelligent clothing ("Smart Cloth") or the like. By means of a microphone, voice recognition can take place for identifying the person. The microphone can also be designed as permanently installed microphone of a door intercom system, of a system for home automation or of a mobile user terminal located at the destination. In addition, the identification can be determined via a fingerprint sensor of an access control device. The aforementioned options for identification enable hardware already existing to be used for improving the method proposed.

To be able to provide information and notes for the user which are as current as possible, a current distance of the user from the destination can first be determined before the note proposed is provided. Especially for known routes, a landmark (e.g., specified by the user) can define the point at which the note is to be provided or the preceding operations should take place. Similarly, a period of time up to an expected arrival at the destination can be determined automatically and compared with a predefined value before the request for identification, the comparing of the identification and the outputting of the note take place. This prevents that the user is pestered with notes which no longer correspond to the current circumstances by his arrival at the destination.

To prevent persons only temporarily located at the destination leading to notes, it can be checked whether the recognized person has stayed at the destination for a minimum period so that, for example, a supplier, a passer-by or the like do not lead to a note for the user. The minimum period can be, for example, in an integral range of minutes between 1 minute and 30 minutes. The longer the period of the person staying at the destination, the higher the probability that the information is relevant for the approaching user and there is, for example, a starting point for a conversation even when the relevant person has already left the destination again before the user arrives there.

The destination can be, for example, a home address, a work address and/or a point-of-interest. The addresses stored in an address book of the user may be used as possible destinations.

The note regarding the person or the person-related data, respectively, can be output to the user by means of a device via which the destination has previously been defined. In other words, the device used for navigation can also, for example, be used for providing the note regarding the persons located at the destination. In this way, a logical and intuitive link of the route with the persons located at the end of the route is established.

Together with the note, person-related data and/or information associated with these can be output to the user which are useful for the user for a successful and/or pleasant conversation. For example, current information from the daily press, from the weather prediction or from the sports messages of the home country and/or the home town of the person can be output to have a current starting point for a conversation. Similarly, information which can be used independently of current messages can be included in the note which, for example, identify the significance of the name of the person or information relating to famous personalities from the home town or the home country, respectively. This enables the user to be prepared in the best possible way for a conversation with persons hitherto unknown to him at the destination.

In support of the user or for presentation of the note, respectively, a web page can be called up from the Internet which contains additional person-related data. In other words, a current presentation of the web page is generated so that the user can independently select that information and, if necessary, appreciate it in a greater depth of detail to prepare himself for the person.

A recommendation of action may also output to the user on the basis of the person-related data which can be derived, e.g., automatically, from the person-related data. Particularly in relation with person-related data of the user, the recommendations of actions can recall awkward subjects of conversation to be avoided, submit the proposal of purchasing a present (and which) or to prepare oneself for olfactory sensitivities of the person at the destination in that the user is encouraged to apply little perfume or to avoid garlic and onions during food consumption and tobacco products as stimulants.

If the identified person present is, for example, a person who has become delinquent, the method can comprise automatic sending of a note with respect to the person-related data to a surveillance institution (a security service, the police or the like) if a requirement for action arises for this due to the person-related data. Sending the note can take place due to a previous authorization by the user and thus presuppose his agreement.

According to a second disclosed embodiment, a device for informing a user on approaching a destination is proposed. The device comprises a destination store for storing a destination (e.g., as destination of a navigation route), a wireless transmitting/receiving device for communication with a periphery of the device, an evaluating unit (e.g., a programmable processor) and an output device for outputting a note to the user of the device. The wireless transmitting/receiving device can be configured, for example, to establish a link with the Internet by means of a WLAN signal and/or a mobile telecommunication standard (e.g., UMTS, LTE, LTE-A) to, on the one hand, receive the identification of the data representing the person and also the person-related data. The evaluating unit is configured to compare the identification with associated person-related data and, for example, to determine a relevance of the person with respect to the user. The output device can comprise a screen and/or a loudspeaker to output the corresponding note to the user. The device can be designed as component of a means of transportation and/or as component of a user terminal/wireless communication terminal. A device as described before is therefore configured to carry out a method as has been described in detail above in conjunction with the embodiment mentioned first. The features, feature combinations and the advantages resulting from these obviously correspond to those of the disclosed method such that the above statements are referred to avoid repetitions.

According to a third disclosed embodiment, a computer program product (e.g., a data memory) is proposed on which instructions are stored which enable a programmable processor to carry out the operations of a method according to the embodiment mentioned first. The computer program product can be designed as CD, DVD, Blue-Ray disk, flash memory, hard disk, RAM/ROM, cache etc.

According to a fourth disclosed embodiment, a signal sequence representing instructions is proposed which enable a programmable processor to carry out the operations of a method according to the embodiment mentioned first. In this manner, the informative provision of the instructions is also placed under protection for the case that the storage means required for this purpose are outside the range of validity of the attached claims.

According to a fifth disclosed embodiment, a means of transportation (e.g., a passenger car, a transporter, a truck, a motorcycle, an aircraft and/or water craft) is proposed which comprises a device according to the embodiment named secondly. With respect to the features, feature combinations and the advantages resulting from this reference is also made to the above statements to avoid repetitions.

FIG. 1 shows a house 2 as destination of a user 1 who is located in a passenger car 10 as means of transportation on the way home. The current distance is x kilometers in response to which the electronic control device 13, as evaluating unit, sends a signal S1 via the Internet 11. From the Internet 11, a corresponding message S2 is sent to a WLAN router 8 which is connected information-technologically to a microphone 6 of a system for home automation, a camera 5 for monitoring the interior of the house 2 and to a monitoring camera 5 for monitoring a forecourt of the house 2. In addition, a fingerprint sensor 7 arranged in the entry door is connected information-technologically to the WLAN router 8. In addition to the aforementioned sensors, the persons 3a, 3b, 3c, 3d can be identified by means of electronic identifiers of electronic devices carried along. This is the case, for example, when the WLAN router 8 can resolve the MAC addresses of the devices and associate them with the person-related data known to the system. The monitoring camera 5 carries out a face recognition 15 of the approaching guest 3d. Accordingly, a data-technologically optimized message S3 or S4, respectively, can be sent to the antenna 9 of the passenger car 10 and the face recognition 15 compared with records stored in a data memory 4a. If the person 3d still remains in the house 2 after a predefined period of time, a corresponding note is produced via a screen 12 of the passenger car 10 to the user 1 so that the latter can adapt to the presence of the person 3d at the time of his presumable arrival. If the electronic control device 13 determines that the person 3d or another person present is a person of the user 1 networked in a social network, corresponding current data can be called up via a message S5 from a data server 4b connected to the Internet 11 and displayed on the screen 12. If, in contrast, it is determined that one of the present persons 3a to 3d is a person who has become delinquent, a message can be sent to a nearest police station 14 by means of a message S6 to initiate official steps.

Figure 2:
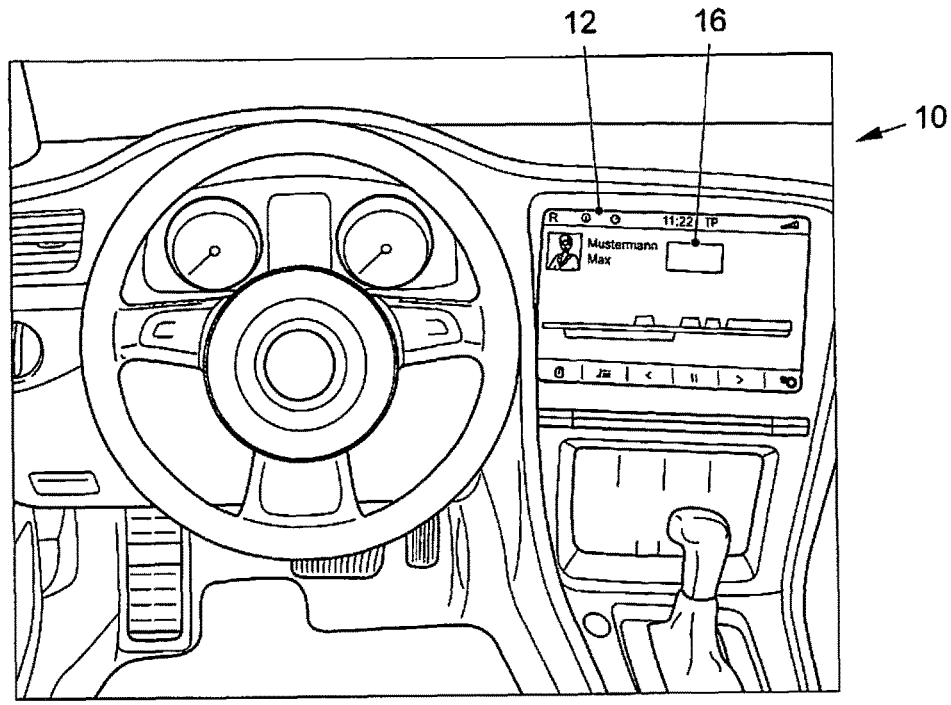
FIG. 2 shows a diagrammatic view of a driver workstation in an illustrative embodiment of a means of transportation.

FIG. 2 shows a representation of an illustrative embodiment of a driver workstation in a passenger car 10 in the dashboard of which a screen 12 is used for displaying person-related data of Mr Max Mustermann. The presentation contains a link 16 via which the user can reach a personal web presence of Mr Mustermann.

Figure 3:
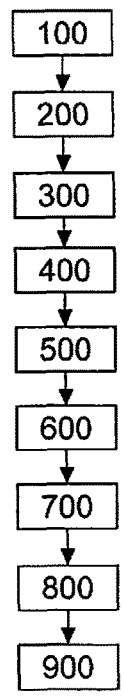
FIG. 3 shows a flowchart illustrating operations of an illustrative embodiment of a method for informing a user on approaching a destination.

FIG. 3 shows a flowchart illustrating operations of an illustrative embodiment of a disclosed method for informing a user on approaching a destination. In operation 100, the destination is predefined for the user in that the user outputs a command for driving to his home address. Subsequently, it is checked in operation 200 whether a period of time up to a presumable arrival at the destination is reached. If this is so, an identification of a person present at the destination is requested via a WLAN router of the house of the user in operation 300. The WLAN router is connected information-technologically to cameras and microphones of a system for home automation. In operation 400, it is subsequently checked whether an identified person has stayed at the destination for a minimum period. In operation 500, the identification is compared with associated person-related data via the Internet. In this context, accesses to a personal profile are performed within a social network of the person identified if the person is linked to the user. In operation 600, a note is output to the user with respect to the person via a screen of his means of transportation. In operation 700, additional current information associated with the person-related data is output to the user to present background information for the person to the user. In operation 800, information associated with the person-related data is downloaded from a web page and displayed to the user. In operation 900, a recommendation of action is output to the user. This consists in purchasing a present, for example, flowers, before the user faces the person located at the destination since the person is the daughter of the user who, according to a status message in a social network, has passed an important exam.

As a result, the disclosed method conducts the user not only to the destination but conducts the user in the best possible way into a situation existing at the destination. With this knowledge, the user travels in a more relaxed manner and can make the best possible use of the situation for himself. Participation in the road traffic becomes safer and more comfortable due to the care-free journey there.

Although the disclosed has been described in detail by the illustrative embodiments explained in conjunction with the attached figures of the drawings, modifications and combinations of features of the illustrative embodiments shown are possible for the expert without departing from the range of the present disclosure.

LIST OF REFERENCE DESIGNATIONS

1 User
2 House of the user
3a-d Persons
4a Data memory (local)
4b Data server
5 Monitoring camera
6 Microphone
7 Fingerprint sensor
8 WLAN router
9 Antenna
10 Passenger car
11 Internet
12 Screen
13 Electronic control device
14 Police station
15 Face recognition
16 Link on web page
100 to 900 Method steps
S1 to S6 Messages
x Kilometers, current distance between house 2 and passenger car 10

The invention claimed is:
1. A method for informing a user of a transportation vehicle that the transportation vehicle is approaching a destination and a notification regarding one or more persons present at the approached destination, the method comprising:

predefining the destination for the user based on the approached destination, wherein the destination has been input into a navigation system of the transportation vehicle;

monitoring a period of time up to an expected arrival at the approached destination;

automatically requesting identification of one or more persons present at the approached destination in response to the period of time up to the expected arrival at the approached destination being below a threshold level;

receiving the identification of the one or more persons present at the approached destination;

comparing the received identification with associated, stored, person-related data to generate social interaction recommendation data;

checking a current distance between the user and the approached destination; and outputting a notification to the user with respect to the one or more persons located at the approached destination in response to the result of the comparison once the current distance to the approached destination is below a threshold level, wherein the notification includes at least person-related data for the identified one or more persons at the approached destination.

2. The method of claim 1, wherein the person-related data are stored on a data memory, and/or in an Internet-based platform-based, personal profile of a social network, and/or in a database for persons who have become delinquent.

3. The method of claim 1, wherein the identification takes place by a camera, and/or an electronic identification, and/or a microphone, and/or a fingerprint sensor.

4. The method of claim 1, further comprising checking whether the one or more persons have stayed at the destination for a minimum period.

5. The method of claim 1, wherein the predefining the destination comprises automatic or user-supported defining of a destination address using the navigation system included in the transportation vehicle.

6. The method of claim 1, further comprising outputting a notification regarding information associated with the person-related data to the user, via the navigation system of the transportation vehicle.

7. The method of claim 1, further comprising accessing an Internet presence comprising additional person-related data.

8. The method of claim 1, further comprising outputting the generated social interaction recommendation data which includes a recommendation for action to the user based on the person-related data.

9. The method of claim 1, further comprising sending a notification with respect to the person-related data from the transportation vehicle to a monitoring institution.

10. A device for informing a user of a transportation vehicle that the transportation vehicle is approaching a destination and a notification regarding one or more persons present at the approached destination, the device comprising:

a destination store;
a wireless transmitting/receiving device;
an evaluating unit; and
an output device,
wherein the destination store receives a definition of the destination, wherein the destination has been input into a navigations system of the transportation vehicle,
wherein the evaluating unit monitors a period of time up to an expected arrival at the approached destination,
wherein the wireless transmitting/receiving device automatically requests, based on the definition of the destination, identification of one or more persons present at the approached destination in response to the period of time up to the expected arrival at the approached destination being below a threshold level,
wherein the wireless transmitting/receiving device receives the identification of the one or more persons present at the approached destination,
wherein the evaluating unit compares the identification with associated, stored, person-related data to generate social interaction recommendation data,
wherein the evaluating unit checks a current distance between the user and the approached destination, and
wherein the output device outputs, in response to the result of the comparison, a notification to the user with respect to the one or more persons once the current distance to the approached destination is below a threshold level, wherein the notification includes at least person-related data for the identified one or more persons at the approached destination.

11. A non-transitory computer program product comprising instructions or instructions representing a signal sequence which, when they are executed on a device, cause the device to perform a method comprising:

predefining the destination for the user based on the approached destination, wherein the destination has been input into a navigation system of the transportation vehicle;

monitoring a period of time up to an expected arrival at the approached destination;

automatically requesting identification of one or more persons present at the approached destination in response to the period of time up to the expected arrival at the approached destination being below a threshold level;

receiving the identification of the one or more persons present at the approached destination;

comparing the received identification with associated, stored, person-related data to generate social interaction recommendation data;

checking a current distance between the user and the approached destination; and outputting a notification to the user with respect to the one or more persons located at the approached destination in response to the result of the comparison once the current distance to the approached destination is below a threshold level, wherein the notification includes at least person-related data for the identified one or more persons at the approached destination.

12. A transportation vehicle comprising a device for informing a user of the transportation vehicle that the transportation vehicle is approaching a destination an a notification regarding one or more persons present at the approached destination, the device comprising:

a destination store;
a wireless transmitting/receiving device;
an evaluating unit; and
an output device,
wherein the destination store receives a definition of the destination, wherein the destination has been input into a navigations system of the transportation vehicle,
wherein the evaluating unit monitors a period of time up to an expected arrival at the approached destination,
wherein the wireless transmitting/receiving device automatically requests, based on the definition of the destination, identification of one or more persons present at the approached destination in response to the period of time up to the expected arrival at the approached destination being below a threshold level, wherein the wireless transmitting/receiving device receives the identification of the one or more persons present at the approached destination, wherein the evaluating unit compares the identification with associated, stored, person-related data to generate social interaction recommendation data, wherein the evaluating unit checks a current distance between the user and the approached destination, and wherein the output device outputs, in response to the result of the comparison, a notification to the user with respect to the one or more persons once the current distance to the approached destination is below a threshold level, wherein the notification includes at least person-related data for the identified one or more persons at the approached destination.

* * * * *